April 17, 1934.  W. W. WEBSTER ET AL  1,954,837
AIRCRAFT GUN MOUNT
Filed March 30, 1931  3 Sheets-Sheet 1
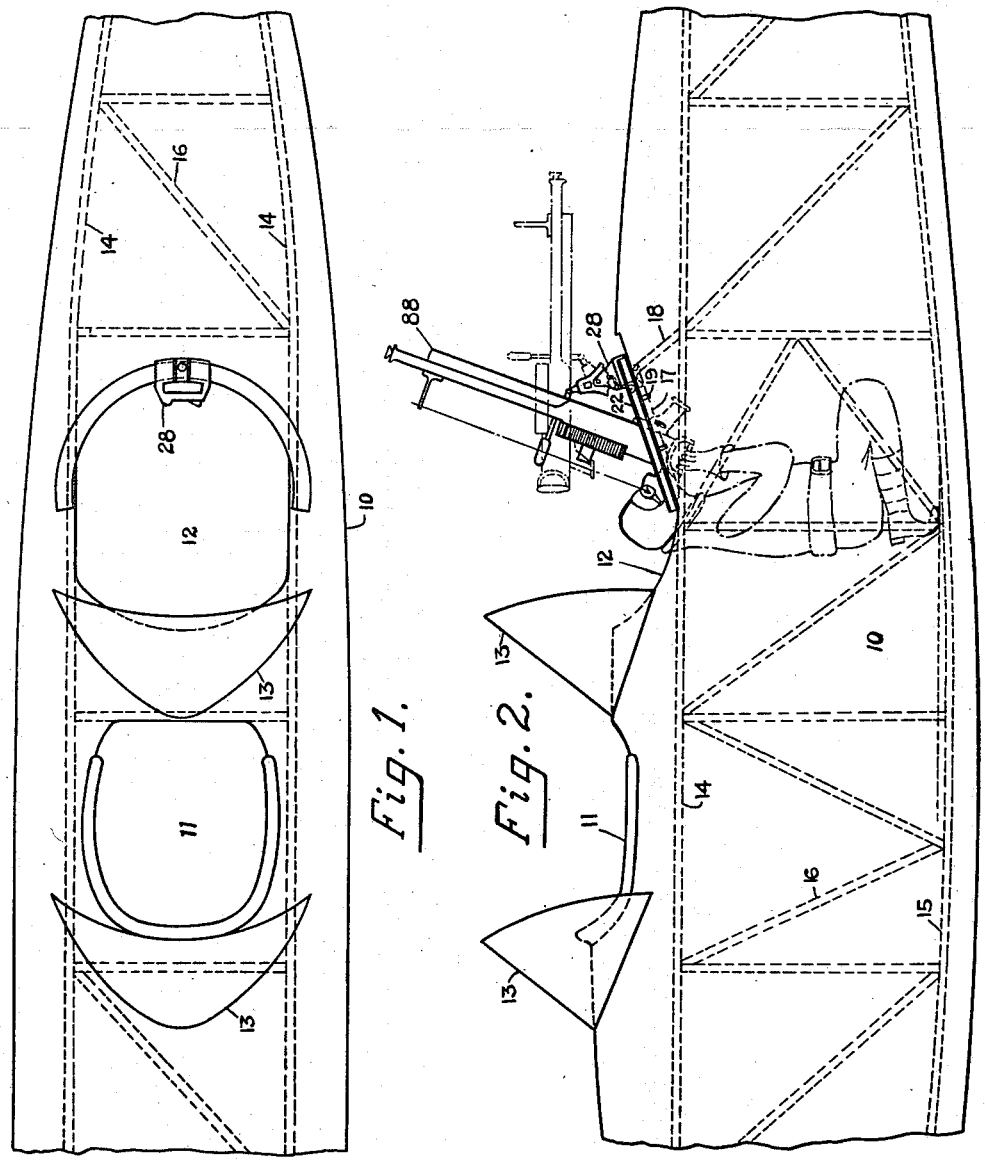
INVENTORS
WALTER W. WEBSTER
AND DAYTON T. BROWN
BY
ATTORNEY April 17, 1934.   W. W. WEBSTER ET AL   1,954,837
AIRCRAFT GUN MOUNT
Filed March 30, 1931    3 Sheets-Sheet 2
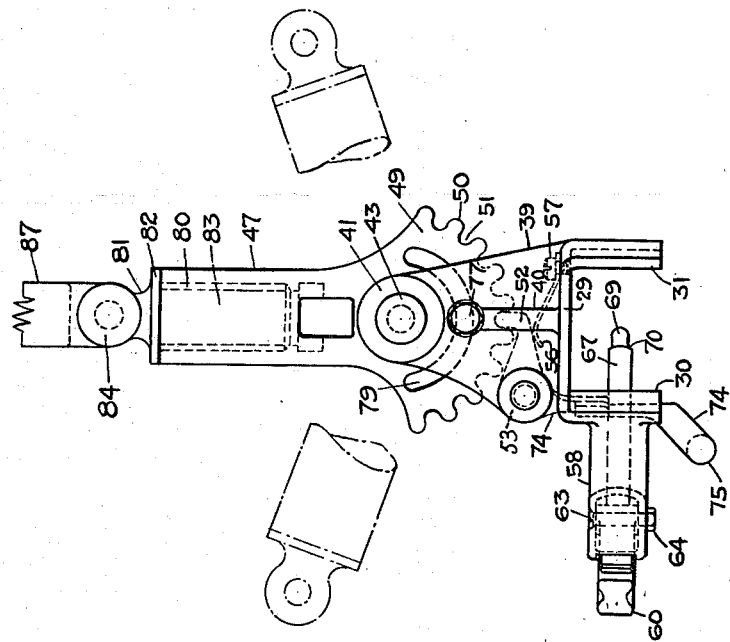
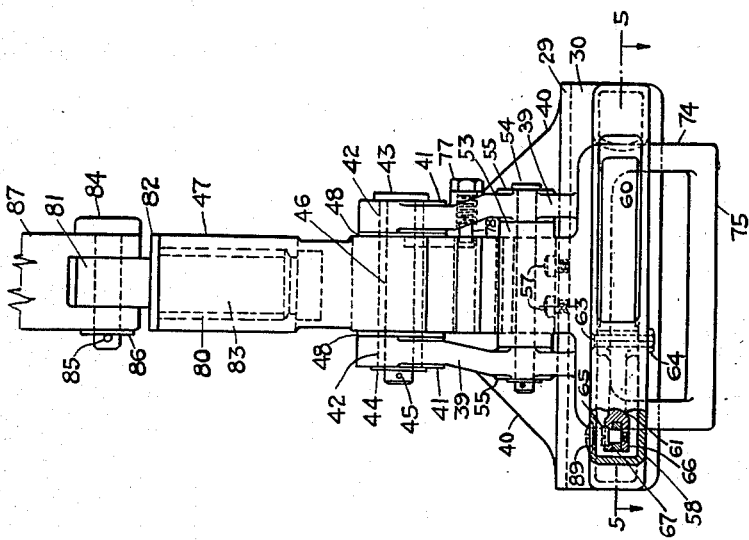
INVENTORS
WALTER W. WEBSTER
AND DAYTON T. BROWN
BY Robert A. Lavender
ATTORNEY April 17, 1934.  W. W. WEBSTER ET AL  1,954,837
AIRCRAFT GUN MOUNT
Filed March 30, 1931   3 Sheets-Sheet 3
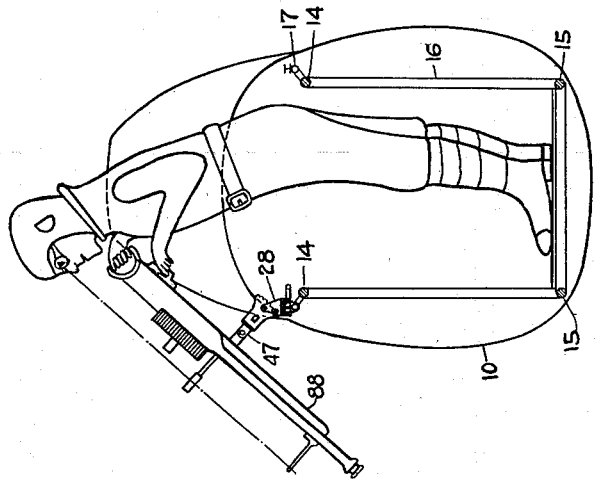
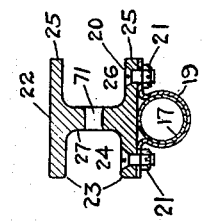
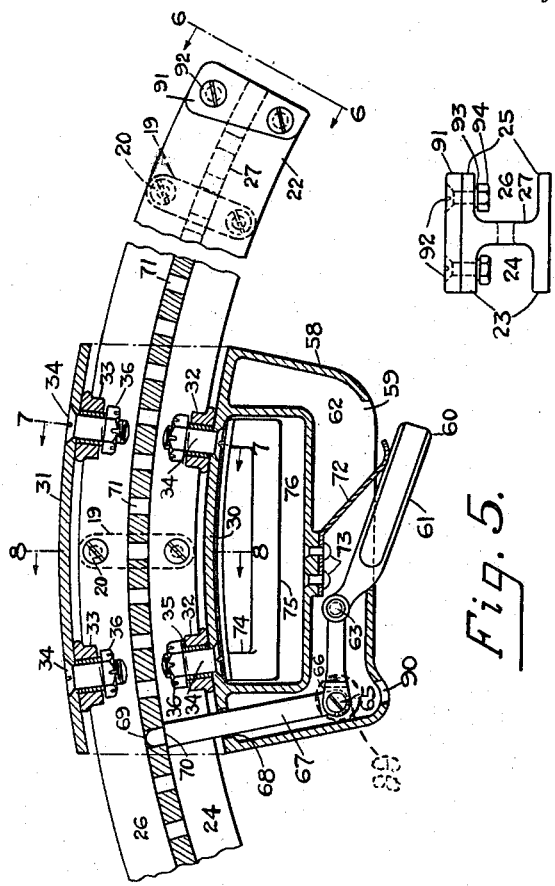
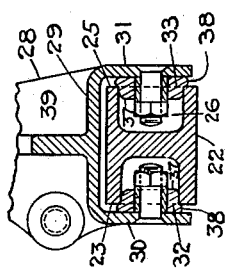
INVENTORS
WALTER W. WEBSTER
AND DAYTON T. BROWN
BY Robert A. Lavender
ATTORNEY Patented Apr. 17, 1934

1,954,837

UNITED STATES PATENT OFFICE 1,954,837

AIRCRAFT GUN MOUNT

Walter W. Webster, United States Navy, and Dayton T. Brown, Detroit, Mich.

Application March 30, 1931, Serial No. 526,430

6 Claims. (Cl. 89—37)

(Granted under the act of March 3, 1883, as amended April 30, 1928; 370 O. G. 757)

Our invention relates broadly to an aircraft gun mount and more particularly to a flexible mount for a machine gun installed on an aircraft.

The primary object of our invention is to provide an aircraft gun mount that can be easily and quickly positioned when training a gun at various angles, taking into consideration the limited space of operation.

Another object of our invention is to provide a gun mount for an airplane cockpit that permits an exceedingly large range of gun fire and allows easy movement of the gun against high wind resistance.

A further object of our invention is to provide an airplane with a gun mount that allows a gunner to change the position of and/or elevation of a gun either simultaneously in one operation or in separate operations, as desired and afford lesser target and exposure of the gunner to air currents in certain firing positions.

Still another object of our invention resides in constructing a gun mount that is not involved in operation, easy to manufacture and not difficult to replace parts; simplicity with effectiveness governing the manufacture and use of the device.

It is also an object of our invention to provide a device that is rugged, of light weight, and the cockpit and the gun are dependently adapted for greater advantage.

With the above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which:

Fig. 1 is a plan view of a portion of an aircraft showing our improved device secured thereto.

Fig. 2 is a side elevation of a portion of an aircraft showing the installation of our improved device with a gun mounted thereon.

Fig. 3 is a front elevation of the carriage assembly of our improved device.

Fig. 4 is a side elevation of Fig. 3.

Fig. 5 is a view on line 5—5 of Fig. 3.

Fig. 6 is a view on line 6—6 of Fig. 5.

Fig. 7 is a view on line 7—7 of Fig. 5.

Fig. 8 is a view on line 8—8 of Fig. 5.

Fig. 9 is a section through a cockpit of an aircraft showing a side elevation of the installation of our improved device.

Referring more particularly to the drawings, in which like characters of reference indicate the same parts, 10 indicates a portion of a fuselage of a conventional type airplane, shown more or less diagrammatically, having pilot and gunner cockpits 11 and 12 respectively that are provided with the usual windshields 13. The fuselage 10 has in its construction upper longérons 14, lower longérons 15 and supporting braces 16 therebetween.

Positioned around the top rear part of cockpit 12 is our improved gun mount supported on a base 17 secured to the fuselage 10 at point substantially coincident with the upwardly inclined rear and lateral edge of the cockpit 12. The base 17 is preferably a shaped bar or tube bent in an arc of approximately 240 degrees and is set on a bias by varying length supports 18 extending from longérons 14. The tubes 18 may be either welded or otherwise secured to longérons 14 and tube 17. The plane of the base 17 is inclined upwardly and rearwardly at an angle to the horizontal so that the weight of gun and gun mount when free to move tends to counteract the wind force from forward, that is, to decrease the force necessary to move the gun mounted on base 17 to either side with or against the wind.

Secured by clips 19, bolts 20 and nuts 21 to base 17 and following the contour thereof is a curved track 22 consisting of flanges 23 forming an inner U-shaped raceway 24, flanges 25 forming an outer U-shaped raceway 26, and a vertical web 27 therebetween. A carriage 28 having a base plate 29 with integral downwardly extending front plate 30 and corresponding rear plate 31 which are placed in juxtaposition to the edges of the flanges 23 and 25, is mounted for movement on track 22 by rollers 32 adapted to rotate in raceway 24 and rollers 33 rotating in raceway 26. Rollers 32 are attached to plate 30 and rollers 33 to plate 31 by bolts 34, spacers 35 and lock nuts 36 so that each of the rollers have their body portions 37 positioned to ride on the inner surfaces of the flanges making up the raceways and their rounded bossed edges 38 bear against the ends of the raceway flanges. In order to permit free movement of the carriage on the track 22 and to prevent binding of the rollers 32 and 33, raceway 26 and rollers 33 are constructed larger in diameter than raceway 24 and rollers 32 and all the rollers are mounted on the spacers 35 to permit slight reciprocating movement. To limit the movement of carriage 28 stop plates 91 are secured on each end of the track 22 by bolts 92, lock washers 93 and nuts 94.

Extending up from and integral with base 29 of the carriage 28 are parallel arms 39 reinforced by webbing 40. The upper portion of arms 39 terminate in bossed apertures 41 in which are fitted bearings 42 for pin or bolt 43 secured to washer 44 and pin 45. Mounted for rotation on a bearing 46 placed on bolt 43 is a post 47 evenly spaced between arms 39 by washers 48. The lower part of post 47 is provided with a sector ratchet 49 having teeth 50 and recesses 51 adapted to engage a pawl 52 having a cylindrical member 53 positioned by pin 54 extending through bossed apertures 55 in arms 39. A spring 56 fastened by screws 57 to base 29 keeps the pawl 52 in engagement with the ratchet 49.

A hollow handle 58 cast to plate 30 has an opening 59 through which protrudes conveniently toward the gunner one end 60 of a lever 61 pivoted inside the hollow portion 62 of the handle 58 by a bolt 63 and a nut 64. Also pivoted to a forked end 66 of lever 61 in portion 62 by stud screws 65 is a stop pin 67 extending through an aperture 68 in plate 30 into raceway 24. The diameter of the end 69 of pin 67 is reduced forming shoulder 70 so as to permit the limited insertion of end 69 into one of a series of preferably evenly spaced holes 71 in the track web 27 with the shoulder 70 bearing against the web 27. A spring 72 secured by rivets 73 holds the protruding end 60 of lever 61 out, and in turn firmly keeps end 69 of pin 67 in one of the holes 71 when the same is in alignment therewith. By exerting pressure on the end 60, the lever 61 will turn on its pivot 63 to reciprocate pin 67 thus pulling end 69 out of its hole or recess 71 in the web 27 to allow movement and permit the unlocking of the gun mount relative to carriage 28. In order to properly assemble pin 67 to lever 61, an aperture adapted to receive a screw-plug 89, Fig. 3, dotted lines in Fig. 5, is provided in the upper horizontal wall of handle 58 to facilitate the association of screw 65, and aperture 90, Fig. 5, is provided in handle 58 to facilitate the association of pin 67.

Integral with pawl cylinder 53 and at right angles to pawl 52 is a grip handle 74 that has its cross bar 75 conveniently positioned to lever 60 and grip opening 76 of handle 58 so that the hand gripping handle 58 may at will also operate either or both lever 60 and pawl 52. Outward and upward movement of handle 74 releases the pawl 52 from the ratchet 49 to allow movement of the post 47. A set screw 77, Figs. 3 and 4, threaded through one of the arms 39 has its end 78 in a groove 79 in the sector ratchet 49 to limit the movement of post 47 about its pivot 43.

Revoluble shaft 83 having pivot portion 81 on its outer end is provided with a longitudinal bearing 80 in the outer end of post 47, with collar 82, preferably rigid on shaft 83, bearing against the end of post 47. To maintain the relative longitudinal positions of shaft 83 and post 47, shaft 83 and post 47 are provided with cooperating ring 83a and projection 47a, Figs. 3 and 4. Pivot portion 81 of shaft 83 is pivotally connected in any conventional manner to the machine gun or to a projection 87 thereof. The specific form of such pivotal connection shown is by portion 81 occupying a slot in projection 87 and passing a headed pin 84 horizontally therethrough with washer 86 on the end thereof secured by key-pin 85.

In the practical operation of our improved device, the machine gun 88 is suitably secured to post 47 by means of lug 87 being pinned to the eye member 81 of the swivel assembly which permits free up, down and rotative movement of the gun at a given point, that is, at that part of the cockpit of the plane where the mount is positioned. To increase the angle at which the gun is fired and/or to permit the extension of the gun further out of or into the cockpit and incidentally afford more or less room in the cockpit for the gunner's more convenient control of the gun at any given point about the track 22, the post 47 may be moved either inwardly or outwardly about its axis 43 by pulling up on handle 74 thus releasing pawl 52 from the ratchet end 49 of post 47 and allowing movement to the desired angle where pawl 52 is again placed in engagement with ratchet 49 by gravity upon the releasing of handle 74. When the operator desires to move the gun and the position of the gun mount upon track 22, the stop pin 67 is first released from its locked position in one of the holes 71 by pressing outward on the end 60 of lever 61 while gripping handle 58 and then moving the carriage 28 to the desired position on track 22 where the same may be secured by releasing lever 61. The friction of any such movement of carriage 28 is substantially reduced by its rollers 32 and 33 respectively traveling in raceways 24 and 26. Upon said releasement of pressure on lever 61 its spring 72 will force the point 69 on locking pin 67, guided by aperture 68, either into appropriate hole 71 in web 27 of track 22 to positively lock thereto the carriage 28, or against the surface of said web 27 between any two holes 71 therein where the same may afford a frictional lock of carriage 28. Such frictional lock is readily determinable by the extent lever 60 projects from handle-grip 58. When such frictional locking of carriage is undesirable the carriage 28 may be slightly moved on track 22 until said point 69 enters adjacent hole 71.

If, in the course of moving carriage 28 or otherwise, the gunner desires to move the gun 88 further into or out of its cockpit this may be accomplished through movement of post 47 about its horizontal axis 43. This is attainable by the gunner placing the end of any one or all of the fingers of his hand gripping handle 58 under cross bar 75 of and elevating handle 74 to release pawl 52 from the ratchet 49 of post 47.

It should be appreciated by those skilled in this art that the gun is adapted to be moved about the horizontal axis 84, vertical axis 83, horizontal axis 43, and the curved track 22, as well as in the various combinations and degrees of such movements. This conveniently affords an exceptionally wide range of train, with extreme elevation and depression, of the gun.

It should be likewise appreciated that the rearward and upward inclination of the track 22, and rear edge of the gunner's cockpit, affords greater convenience for the gunner and protection from air currents and a lesser target in many of the firing positions of the gun. Furthermore, the surfaces of the gun exposed to the air currents exert a substantial force thereon which heretofore has increased the force necessary to move the gun about its track but with our rearward upwardly inclined track 22 the force necessary to move the gun thereon when subjected to air currents is substantially reduced and more equalized in its movements up and down the incline.

It will be understood that the above description and accompanying drawings comprehend only the general and preferred embodiment of our invention, and that various changes in construction, proportion and arrangement of parts may be made within the scope of this invention and the appended claims, and without sacrificing any of the advantages of our invention.

The herein described invention may be manufactured and used by or for the Government of the United States for governmental purposes without the payment to us of any royalties thereon.

What we claim is:

1. In combination with an aircraft having a gunner's cockpit, a gun, and a gun mount for said gun comprising a base, means securing said base on an incline around the cockpit, a track secured to the base, a carriage, means movably mounting said carriage on said track, means securing the gun to said carriage, and means adapted to permit said gun securing means to be raised or lowered so as to elevate or lower the gun independent of said carriage.

2. In combination with an aircraft having a gunner's cockpit, a gun, and a gun mount for said gun comprising a base, means securing said base on an incline around the cockpit, a track secured to the base, a carriage, means movably mounting said carriage on the track, means for locking the carriage at any desirable point to said track, means securing the gun to the carriage, and manually operated means connected to the carriage for suitably positioning said gun securing means whereby the gun may be raised or lowered.

3. In combination with an aircraft having a gunner's cockpit, a gun, and a gun mount for said gun comprising a base, means securing said base on an incline around the cockpit with the greatest elevation at the rear of the cockpit, a track secured to and following the contour of said base, a carriage having a base member enveloping said track, rollers secured to said base member for movably mounting said carriage to the track, means adapted to lock the carriage at any desirable point to said track, means securing the gun to said carriage and means adapted to permit said gun securing means to be raised or lowered so as to elevate or lower the gun.

4. In combination with an aircraft having a gunner's cockpit, a gun, and a gun mount for said gun comprising a base, means se base on an incline around said cock having flanges forming two raceways, being secured to and following the the base, a carriage having a base n veloping the raceways, rollers secur base member and positioned to rot raceways, means for locking the carr track, means securing the gun to sa and means adapted to permit said g means to be raised or lowered so as t lower the gun.

5. In combination with an aircraf gunner's cockpit, a gun, and a gun said gun comprising a base, means se base on an incline around said cock secured to said base, a carriage hav member enveloping said track, rollers said base member for movably mot carriage to the track, a hollow han said base member of the carriage, a le ly secured in the hollow portion of and having an end thereof protrudin hollow portion of the handle, a stop to the end of said lever in the handle ed to lock the carriage to said track, r ing said lever and pin in a locked p means adapted to be either raised securing the gun to said carriage.

6. In combination with an aircraj gunner's cockpit, a gun, and a gun mo gun comprising a base, means securir on an incline around the cockpit witl est angle of elevation at the rear of a track secured to and following the said base, a carriage having a base 1 veloping said track, rollers secured t member for movably mounting said the track, a post pivoted to said carrie the said post may be raised or lowe for locking said post at a desired an ber rotatably positioned in the outwai ing end of said post, and means pivot to said rotatable member.

DAYTON T. BR
WALTER W. W